Oct. 13, 1925.
F. E. STEVENS
1,557,376
HANGER STRUCTURE FOR METERS
Filed Feb. 3, 1923
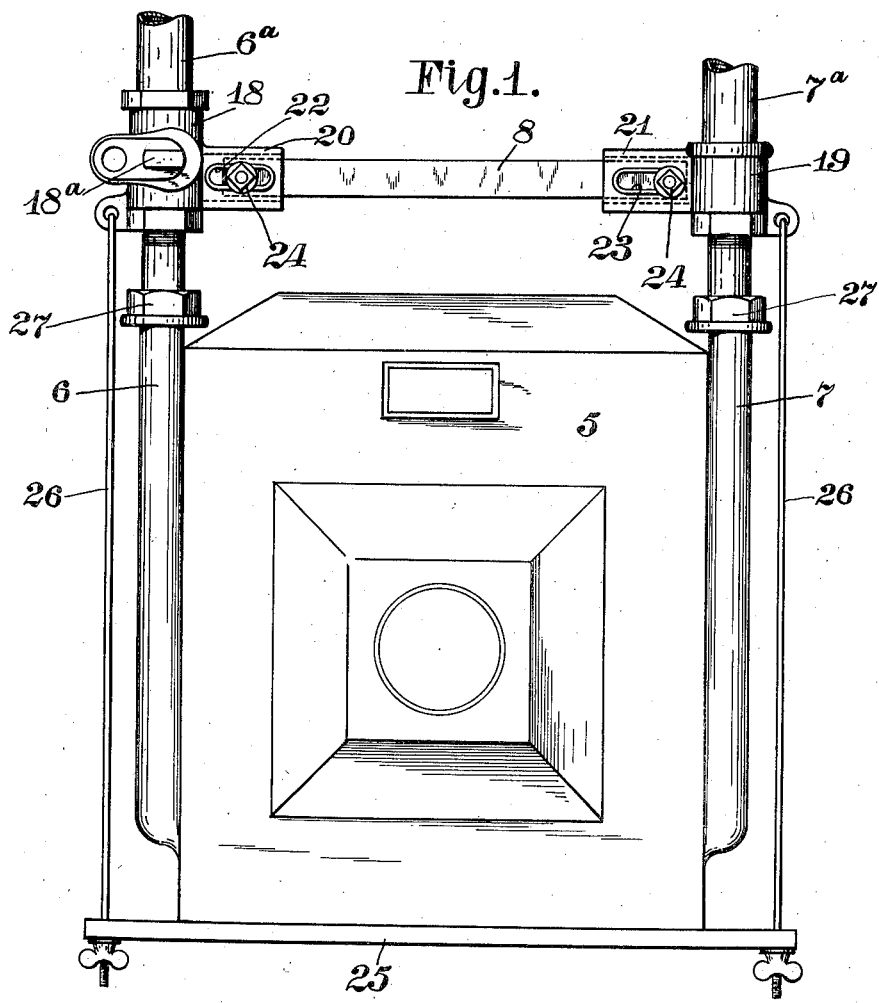
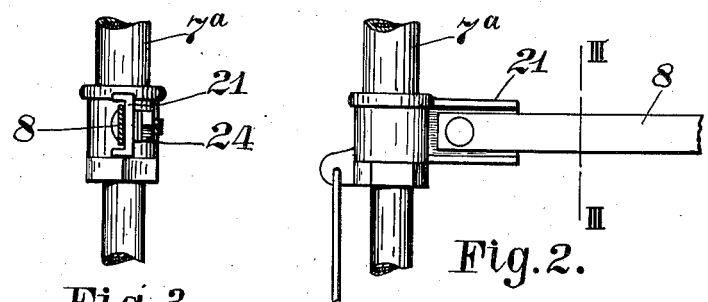
INVENTOR
FRANK E. STEVENS Patented Oct. 13, 1925.

1,557,376

UNITED STATES PATENT OFFICE.

FRANK E. STEVENS, OF COLUMBUS, OHIO, ASSIGNOR TO THE LATTIMER-STEVENS COMPANY, OF COLUMBUS, OHIO, A CORPORATION OF OHIO.

HANGER STRUCTURE FOR METERS.

Application filed February 3, 1923. Serial No. 616,774.

*To all whom it may concern:*

Be it known that I, FRANK E. STEVENS, a citizen of the United States, residing at Columbus, in the county of Franklin and State of Ohio, have invented a certain new and useful Improvement in Hanger Structures for Meters, of which the following is a specification.

Gas meters are often made of sheet metal soldered together by hand and as a consequence are not uniform in size and relative arrangement of their members. The terminals of the inlet and outlet pipes are not uniformly in line and do not always lie in the same plane. Indeed it has been said that no two meters are exactly alike, hence to connect such meters with the street and house pipes is troublesome; and the meters or pipes are often left in a strained condition resulting sometimes in a rupturing of the meter. A variety of means for meeting these conditions have been proposed or patented but such means have been more or less complicated involving many parts and much care in application and adjustment.

The object of the present invention is an improved and simplified means adapted to meet the conditions referred to in a very simple and inexpensive form, and of easy and quick application and adjustment.

My present invention is embodied in the example herein shown and described, the features of novelty being finally claimed.

In the accompanying drawing—

Figure 1 is a front elevation showing an ordinary house gas meter hung with my said invention.

Fig. 2 is a detail view in elevation looking at the rear of one of the connections, said connections being substantially identical as respects my invention.

Fig. 3 is a section on the line III—III looking to the left.

In the views 5 designates the meter which has inlet and outlet pipes 6 and 7 respectively. The hanger in the present invention consists of a bar 8 of steel or other suitable and flexible metal made of suitable length and otherwise of such dimensions that it can, if held when attached to connector pipe sections 18 and 19 in the hand of a man of ordinary strength be fairly easily twisted torsionally and flexed laterally. The inlet and outlet connector pipe sections or couplings 18 and 19 are provided with lateral ears 20 and 21 respectively said ears being provided with grooved or sunken seats for the ends of the bar 8. These seats are each made wider than the width of the bar 8 so that the bar and connector sections can when the fastening means are released rock somewhat vertically with reference to each other. The lateral ears 20 and 21 are each slotted as shown at 22 and 23 and the ends of the bar are provided with threaded pins to pass through said slots and receive washers and nuts as shown at 24 for securing the ends of the bar when the adjustment has been made.

The pipe section 18 contains an ordinary cut off valve $18^a$.

When a meter is to be hung the nut or nuts at 24 are loosened and the pipe sections 18 and 19 applied to the service and house pipes $6^a$ and $7^a$. The meter is then connected by means of nipples and unions 27. Upon tightening up the nuts 24 the bar 8 naturally twists or springs or permits movement to accommodate the existing conditions after which the nuts are turned up to secure the parts together whereby placing the strain, if any, on the bar 8 and relieving the meter of strains on it.

A shelf bar 25 supported by wire rods 26 connected with eyes on the pipe sections 18 and 19 can be provided to aid in supporting the meter after the connections have been effected. Thumb screws on the wire rods serve to adjust the shelf bar to relieve the weight of the meter on the union.

The forms of the parts can be changed without departing from the gist of the invention as claimed.

What I claim is:

A hanger structure for a meter including meter-inlet and meter-outlet pipe-connecting sections, each provided with a seat, and a member connecting said sections consisting of a thin flat bar of resilient material tortionally deformable to fit flatwise at its ends on said seats, and means rigidly securing said bar at its ends to said seats.

FRANK E. STEVENS.